US011955302B2

(12) United States Patent
Otsuka et al.

(10) Patent No.: US 11,955,302 B2
(45) Date of Patent: Apr. 9, 2024

(54) ELECTROMAGNETIC RELAY HAVING EMBEDDED CONTACT FLUSH TO TERMINAL SURFACE

(71) Applicant: OMRON CORPORATION, Kyoto (JP)

(72) Inventors: Kohei Otsuka, Omuta (JP); Ryota Minowa, Yamaga (JP); Hiroyuki Iwasaka, Kamimashiki (JP); Yasuo Hayashida, Kumamoto (JP); Shingo Mori, Yamaga (JP); Naoki Kawaguchi, Yame (JP)

(73) Assignee: OMRON CORPORATION, Kyoto (JP)

( * ) Notice: Subject to any disclaimer, the term of this patent is extended or adjusted under 35 U.S.C. 154(b) by 620 days.

(21) Appl. No.: 17/262,217

(22) PCT Filed: Feb. 18, 2019

(86) PCT No.: PCT/JP2019/005933
§ 371 (c)(1),
(2) Date: Jan. 22, 2021

(87) PCT Pub. No.: WO2020/044607
PCT Pub. Date: Mar. 5, 2020

(65) Prior Publication Data

US 2021/0304991 A1 Sep. 30, 2021

(30) Foreign Application Priority Data

Aug. 28, 2018 (JP) ................................. 2018-158999

(51) Int. Cl.
*H01H 50/54* (2006.01)
*H01H 50/14* (2006.01)
(Continued)

(52) U.S. Cl.
CPC .......... *H01H 50/14* (2013.01); *H01H 50/546* (2013.01); *H01H 50/56* (2013.01); *H01H 50/60* (2013.01)

(58) Field of Classification Search
CPC ...... H01H 50/546; H01H 50/60; H01H 50/14; H01H 50/56
See application file for complete search history.

(56) References Cited

U.S. PATENT DOCUMENTS

2010/0060392 A1 3/2010 Cho et al.
2015/0187527 A1* 7/2015 Kubono ................ H01H 50/18 335/189

(Continued)

FOREIGN PATENT DOCUMENTS

JP 2002-334644 A 11/2002
JP 2007-329088 A 12/2007

(Continued)

OTHER PUBLICATIONS

The Office Action of the corresponding Japanese application No. 2018-158999 dated Mar. 1, 2022.

(Continued)

*Primary Examiner* — Harry R Behm
(74) *Attorney, Agent, or Firm* — SHINJYU GLOBAL IP

(57) ABSTRACT

An electromagnetic relay includes a fixed terminal, a movable contact piece, a first contact, and a second contact. The fixed terminal includes a first surface. The movable contact piece includes a second surface disposed to face the first surface. The first contact is embedded in one of the fixed terminal or the movable contact piece to be flush with one of the first surface or the second surface. The second contact is disposed on the other of the fixed terminal or the movable contact piece to face the first contact. The second contact protrudes from the other of the first surface or the second surface toward the first contact and include a contact surface (Continued)

smaller than the first contact when viewed from a direction facing the first contact.

6 Claims, 8 Drawing Sheets

(51) Int. Cl.
*H01H 50/56* (2006.01)
*H01H 50/60* (2006.01)

(56) References Cited

U.S. PATENT DOCUMENTS

| | | | | |
|---|---|---|---|---|
| 2015/0206666 | A1 | 7/2015 | Naka et al. | |
| 2016/0233039 | A1* | 8/2016 | Kanematsu ............ | H01H 50/38 |
| 2017/0148596 | A1 | 5/2017 | Ozaki et al. | |
| 2021/0027964 | A1* | 1/2021 | Yamakawa ............ | H01H 47/02 |

FOREIGN PATENT DOCUMENTS

| | | | |
|---|---|---|---|
| JP | 2010-62140 | A | 3/2010 |
| JP | 2013-239452 | A | 11/2013 |
| JP | 2014-63674 | A | 4/2014 |
| JP | 2014-116256 | A | 6/2014 |
| JP | 2015-046373 | A | 3/2015 |
| JP | 2015-170531 | A | 9/2015 |
| JP | 2016-4757 | A | 1/2016 |
| JP | 6281301 | B2 | 2/2018 |

OTHER PUBLICATIONS

The International Search Report of International Application No. PCT/JP2019/005933 dated Apr. 16, 2019.
The Written Opinion of International Searching Authority of International Application No. PCT/JP2019/005933 dated Apr. 16, 2019.

* cited by examiner

ELECTROMAGNETIC RELAY HAVING EMBEDDED CONTACT FLUSH TO TERMINAL SURFACE

CROSS-REFERENCE TO RELATED APPLICATION

This application is the U.S. National Phase of International Application No. PCT/JP2019/005933, filed on Feb. 18, 2019. This application claims priority to Japanese Patent Application No. 2018-158999, filed Aug. 28, 2018. The contents of that application are incorporated by reference herein in their entireties.

FIELD

The present invention relates to an electromagnetic relay.

BACKGROUND

Conventionally, electromagnetic relays that open and close an electric circuit are known. For example, an electromagnetic relay of Japanese Patent No. 6281301 includes a fixed terminal, a fixed contact disposed on the fixed terminal, a movable contact piece, and a movable contact disposed on the movable contact piece. The movable contact is contactable with the fixed contact, and the electric circuit is opened and closed when the movable contact comes into contact with the fixed contact or is separated from the fixed contact. Further, the electromagnetic relay is provided with a permanent magnet for extending an arc generated when the movable contact is separated from the fixed contact (see Japanese Patent No. 6281301).

SUMMARY

In the electromagnetic relay of Japanese Patent No. 6281301, the fixed contact protrudes from the fixed terminal toward the movable contact. Further, the movable contact protrudes from the movable contact piece toward the fixed contact. Therefore, a step is generated between the fixed contact and the fixed terminal and between the movable contact and the movable contact piece.

If there is the step between the fixed contact and the fixed terminal and between the movable contact and the movable contact piece, when an arc is generated, the arc sticks to the step, and the extension of the arc is hindered. Therefore, it is necessary to use a magnet stronger than necessary in order to extend the arc. Further, if the arc is stuck, an arc cutoff time becomes long, so that consumption of the contacts becomes large and the life of the electromagnetic relay may be shortened.

An object of the present invention is to reduce sticking of an arc when a movable contact is separated from a fixed contact.

(1) An electromagnetic relay according to one aspect of the present invention includes a fixed terminal, a movable contact piece, a first contact, a second contact, a drive shaft, and an electromagnetic drive device. The fixed terminal includes the first surface. The movable contact piece includes a second surface disposed to face the first surface. The first contact is embedded in one of the fixed terminal or the movable contact piece to be flush with one of the first surface or the second surface. The second contact is disposed on the other of the fixed terminal or the movable contact piece to face the first contact. The second contact protrudes from the other of the first surface or the second surface toward the first contact and include a contact surface smaller than the first contact when viewed from a direction facing the first contact. The drive shaft is integrally movably connected to the movable contact piece. The electromagnetic drive device moves the drive shaft in a contact direction in which the first contact and the second contact come into contact with each other and in a separation direction in which the first contact and the second contact are separated from each other.

In this electromagnetic relay, the first contact is embedded in one of the fixed terminal or the movable contact piece to be flush with one of the first surface or the second surface. For example, when the first contact is embedded in the fixed terminal to be flush with the second surface of the fixed terminal, there is no step between the first contact and the fixed terminal. Thereby, when an arc occurs, it is possible to prevent the arc from sticking between the first contact and the movable contact piece. Further, since the second contact can contact the first contact with a contact surface smaller than the first contact, even if the position of the movable contact piece shifts when the movable contact piece moves, the first contact and the second contact can be reliably brought into contact with each other. Thereby, for example, when the first contact is disposed on the fixed terminal and the second contact is disposed on the movable contact piece, it is possible to prevent the second contact and the fixed terminal from coming into contact with each other.

(2) Preferably, the first surface of the fixed terminal has a flat shape along the direction orthogonal to the drive shaft, the first contact is embedded in the fixed terminal to be flush with the first surface, and the second contact protrudes from the second surface of the movable contact piece toward the first contact. In this case, it is possible to prevent an arc from sticking between the first contact and the fixed terminal. Further, since the first surface has a flat shape along the direction orthogonal to the drive shaft, the first contact and the second contact can be stably brought into contact with each other.

(3) Preferably, the fixed terminal includes a recess formed by being recessed from the first surface in the contact direction, and the first contact is disposed in the recess of the fixed terminal. In this case, the positioning of the fixed contact becomes easy when welding the fixed contact to the fixed terminal.

(4) Preferably, the second surface of the movable contact piece has a flat shape along the direction orthogonal to the drive shaft, the first contact is embedded in the movable contact piece to be flush with the second surface, and the second contact protrudes from the first surface of the fixed terminal toward the second contact. In this case, it is possible to prevent an arc from sticking between the first contact and the movable contact piece. Further, since the first surface has a flat shape along the direction orthogonal to the drive shaft, the first contact and the second contact can be stably brought into contact with each other.

(5) Preferably, the movable contact piece includes a recess formed by being recessed from the second surface in the separation direction, and the second contact is disposed in the recess of the movable contact piece. In this case, the positioning of the movable contact becomes easy when welding the movable contact to the movable contact piece.

(6) The electromagnetic relay according to another aspect of the present invention includes a first fixed terminal, a second fixed terminal, a movable contact piece, a first fixed contact, a second fixed contact, a first movable contact, a second movable contact, a drive shaft, and an electromagnetic drive device. The first fixed terminal includes the first surface. The second fixed terminal includes the second surface and is disposed at a distance from the first fixed terminal. The movable contact piece includes a third surface disposed to face the first surface and the second surface. The first fixed contact is a cathode contact and is embedded in the first fixed terminal to be flush with the first surface. The second fixed contact protrudes from the second surface of the second fixed terminal toward the third surface. The first movable contact is disposed to face the first fixed contact, is contactable with the first fixed contact, and protrudes from the third surface toward the first surface. The second movable contact is disposed to face the second fixed contact, is contactable with the second fixed contact, and is embedded in the movable contact piece to be flush with the third surface. The drive shaft is integrally movably connected to the movable contact piece. The electromagnetic drive device moves the drive shaft in a direction in which the first fixed contact and the first movable contact come into contact with each other and the second fixed contact and the second movable contact come into contact with each other and in a direction in which the first fixed contact and the first movable contact are separated from each other and the second fixed contact and the second movable contact are separated from each other. The first movable contact includes a first contact surface smaller than the first fixed contact when viewed from a direction facing the first fixed contact. The second fixed contact includes a second contact surface smaller than the second movable contact when viewed from a direction facing the second movable contact. The first fixed contact and the second movable contact are cathode contacts.

In this electromagnetic relay, for example, when the electromagnetic relay has polarity, it is possible to effectively reduce an arc from sticking by eliminating a step at the contact on the cathode side where the arc is difficult to extend.

DETAILED DESCRIPTION

Figure 1:
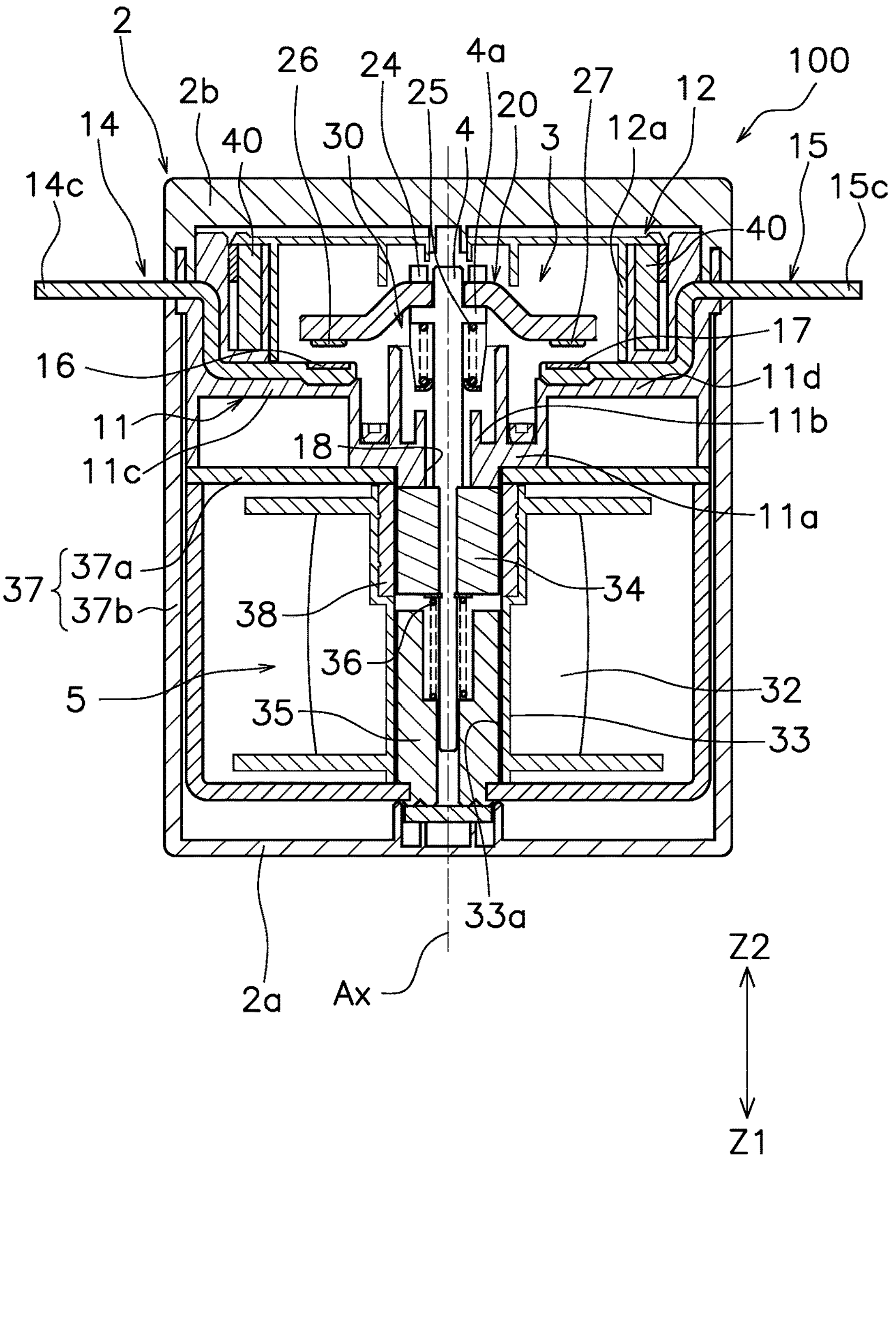
FIG. 1 is a cross-sectional view of an electromagnetic relay according to an embodiment of the present invention.

Hereinafter, embodiments of an electromagnetic relay according to one aspect of the present invention will be described with reference to the drawings. FIG. 1 is a cross-sectional view of the electromagnetic relay 100. As illustrated in FIG. 1, the electromagnetic relay 100 includes a housing 2, a contact device 3, a drive shaft 4, and an electromagnetic drive device 5. In the following description, the direction in which an axis Ax of the drive shaft 4 extends is referred to as “axial direction”. Further, when referring to the drawings, an upper side in FIG. 1 is referred to as “up”, a lower side will is referred to as “down”, a left side is referred to as “left”, and a right side is referred to as “right” in order to facilitate understanding of the description. In this embodiment, a contact direction Z1 is downward in FIG. 1. Further, a separation direction Z2 is upward in FIG. 1. The details of the contact direction Z1 and the separation direction Z2 will be described later.

The housing 2 includes a case 2*a* and a cover 2*b*. The case 2*a* has a substantially quadrangular box shape, and an upper part is opened. The cover 2*b* covers the upper part of the case 2*a*. An inside of the housing 2 is sealed by the case 2*a* and the cover 2*b*. The case 2*a* and the cover 2*b* are made of an insulating material. The contact device 3, the drive shaft 4, and the electromagnetic drive device 5 are housed inside the housing 2.

In the housing 2, a contact case 11 in which the contact device 3 is housed and a contact cover 12 that covers an upper part of the contact case 11 are disposed. The contact case 11 and the contact cover 12 are made of an insulating material.

The contact case 11 includes a bottom portion 11*a*, a cylindrical portion 11*b*, a first contact support portion 11*c*, and a second contact support portion 11*d*. The bottom portion 11*a* is formed in a rectangular shape and a plate shape. The longitudinal direction of the bottom portion 11*a* coincides with the left-right direction in FIG. 1.

The cylindrical portion 11*b* extends in a cylindrical shape in the axial direction. The cylindrical portion 11*b* protrudes downward from the center of the bottom portion 11*a* and protrudes upward from the center of the bottom portion 11*a*. The cylindrical portion 11*b* includes a through hole 18 that axially penetrates the bottom portion 11*a*. The through hole 18 penetrates the center of the bottom portion 11*a* in the axial direction. The drive shaft 4 penetrates the through hole 18 in the axial direction.

The first contact support portion 11*c* is disposed on the left side of the center of the bottom portion 11*a* in the longitudinal direction. The first contact support portion 11*c* is formed so as to protrude upward in a rectangular shape from the bottom portion 11*a*. The second contact support portion 11*d* is disposed on the right side of the center of the bottom portion 11*a* in the longitudinal direction. The second contact support portion 11*d* is formed so as to protrude upward in a rectangular shape from the bottom portion 11*a*.

The contact cover 12 covers the upper part of the contact case 11. The contact cover 12 includes an arc extension wall 12*a* extending toward the bottom portion 11*a*. The arc extension wall 12*a* is made of, for example, a resin or a ceramic material such as aluminum oxide.

The contact device 3 includes a first fixed terminal 14, a second fixed terminal 15, a first fixed contact 16, a second fixed contact 17, a movable contact piece 20, a first movable contact 26, a second movable contact 27, and a contact piece holding portion 30. The first fixed terminal 14, the second fixed terminal 15, the first fixed contact 16, the second fixed contact 17, the movable contact piece 20, the first movable contact 26, and the second movable contact 27 are made of a conductive material.

Figure 2:
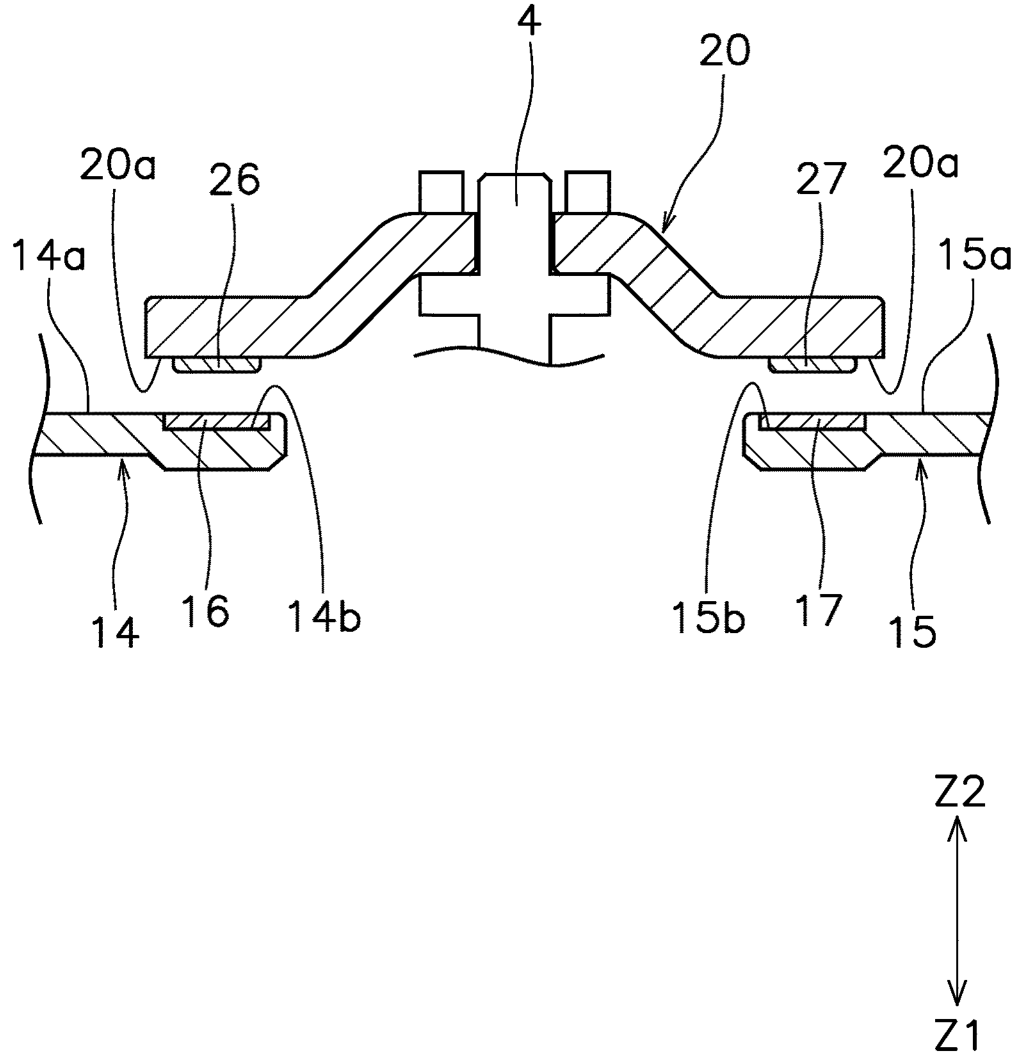
FIG. 2 is an enlarged cross-sectional view of the periphery of a movable contact piece.
Figure 3:
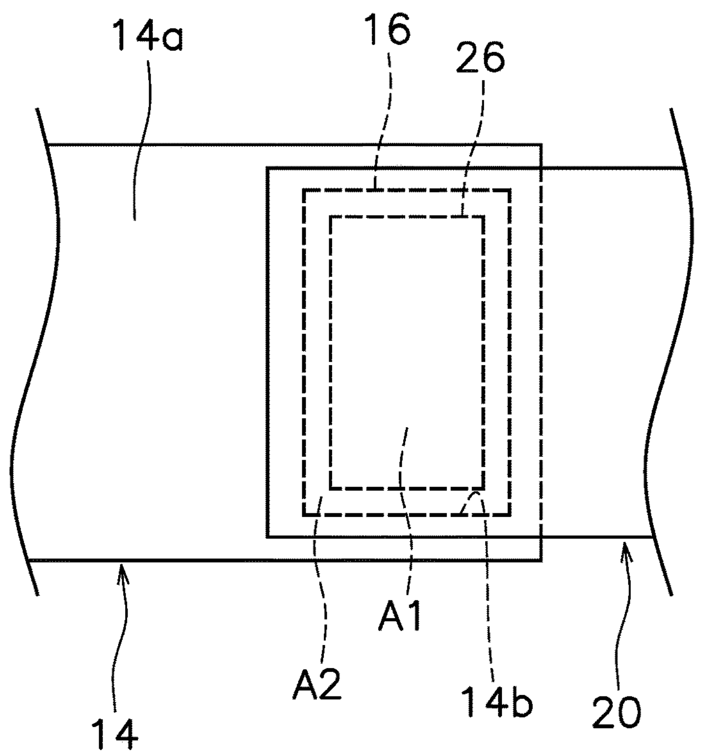
FIG. 3 is a view of a periphery of a first fixed contact as viewed from a separation direction side.

The first fixed terminal 14 extends in the left-right direction and is supported in the housing 2 by the first contact support portion 11*c* of the contact case 11. FIG. 2 is an enlarged view of a periphery of the movable contact piece 20 in FIG. 1. FIG. 3 is a view of a periphery of the first fixed contact 16 as viewed from the separation direction Z2 side.

As illustrated in FIGS. 1 to 3, the first fixed terminal 14 includes a first surface 14*a*, a recess 14*b*, and an external connection portion 14*c*.

The first surface 14*a* is provided on a part of the surface in the separation direction Z2 side in the housing 2. The first surface 14*a* has a flat shape along a direction orthogonal to the drive shaft 4. At least a part of the first surface 14*a* overlaps with the movable contact piece 20 in the axial direction. The recess 14*b* is formed so as to be recessed in the contact direction Z1 from the first surface 14*a*. As illustrated in FIG. 3, the recess 14*b* is surrounded by the first surface 14*a* when viewed from the separation direction Z2 side. The external connection portion 14*c* protrudes from the case 2*a* in the left-right direction.

The second fixed terminal 15 extends in the left-right direction and is supported by the second contact support portion 11*d* of the contact case 11 in the housing 2. The second fixed terminal 15 includes a first surface 15*a*, a recess 15*b*, and an external connection portion 15*c*. As illustrated in FIG. 1, since the second fixed terminal 15 has a symmetrical shape with the first fixed terminal 14 with the axis Ax of the drive shaft 4 interposed therebetween, the description thereof will be omitted.

The first fixed contact 16 is connected to the first fixed terminal 14. The first fixed contact 16 is embedded in the first fixed terminal 14 to be flush with the first surface 14*a* of the first fixed terminal 14. A surface on the separation direction Z2 side of the first fixed contact 16 has a flat shape along the direction orthogonal to the drive shaft 4. The first fixed contact 16 is disposed in the recess 14*b*, and a surface on the separation direction Z2 side of the first fixed contact 16 is connected to the first surface 14*a* without a step. By arranging the first fixed contact 16 in the recess 14*b*, the positioning of the first fixed contact 16 becomes easy when welding the first fixed contact 16 to the first fixed terminal 14.

The second fixed contact 17 is connected to the second fixed terminal 15. The second fixed contact 17 has a symmetrical shape with the first fixed contact 16 with the axis Ax of the drive shaft 4 interposed therebetween. The second fixed contact 17 is embedded in the second fixed terminal 15 to be flush with the first surface 15*a* of the second fixed terminal 15. The second fixed contact 17 is disposed in the recess 15*b*, and a surface on the separation direction Z2 side of the second fixed contact 17 is connected to the first surface 15*a* without a step.

The movable contact piece 20 extends in the left-right direction in the contact case 11. The movable contact piece 20 is disposed to face the first fixed terminal 14 and the second fixed terminal 15. The movable contact piece 20 includes a second surface 20*a*. The second surface 20*a* is disposed at both ends of the movable contact piece 20. Specifically, the second surface 20*a* is disposed to face the first surface 14*a* of the first fixed terminal 14 and the first surface 15*a* of the second fixed terminal 15. The second surface 20*a* has a flat shape along a direction orthogonal to the drive shaft 4. The second surface 20*a* does not necessarily need to have a flat shape.

The movable contact piece 20 is movable in the contact direction Z1 that contacts the first fixed contact 16 and the second fixed contact 17, and the separation direction Z2 that separates from the first fixed contact 16 and the second fixed contact 17.

The contact direction Z1 is the direction in which the first movable contact 26 and the second movable contact 27 come into contact with the first fixed contact 16 and the second fixed contact 17 (downward in FIG. 1). The separation direction Z2 is the direction in which the first movable contact 26 and the second movable contact 27 are separated from the first fixed contact 16 and the second fixed contact 17 (upward in FIG. 1). The contact direction Z1 and the separation direction Z2 coincide with the axial direction.

The first movable contact 26 is connected to the movable contact piece 20. The first movable contact 26 is disposed to face the first fixed contact 16 and is contactable with the first fixed contact 16. The first movable contact 26 protrudes from the second surface 20*a* of the movable contact piece 20 toward the first fixed contact 16. A surface on the separation direction Z2 side of the first movable contact 26 has a flat shape along the direction orthogonal to the drive shaft 4. The first movable contact 26 may be attached to the second surface 20*a*, or a part of the first movable contact 26 may be embedded in the movable contact piece 20.

As illustrated in FIG. 3, the first movable contact 26 completely overlaps the first fixed contact 16 when viewed from a direction facing the first fixed contact 16. In other words, the first movable contact 26 overlaps with the first fixed contact 16 in the axial direction as a whole. Further, the first movable contact 26 includes a contact surface A1 smaller than a contact surface A2 of the first fixed contact 16 when viewed from the direction facing the first fixed contact 16.

The contact surface A1 has a surface area at which the first movable contact 26 can contact the first fixed contact 16. In the present embodiment, the contact surface A1 is the surface area of the first movable contact 26 on the contact direction Z1 side.

The contact surface A2 is a surface area where the first fixed contact 16 can contact the first movable contact 26. In the present embodiment, the contact surface A2 is the surface area on the separation direction Z2 side of the first fixed contact 16.

As illustrated in FIG. 3, in the longitudinal direction of the movable contact piece 20, the size of the first movable contact 26 is smaller than the size of the first fixed contact 16. Further, in the lateral direction of the movable contact piece 20, the size of the first movable contact 26 is smaller than the size of the first fixed contact 16. An outer edge of the first movable contact 26 is disposed more inside than an outer edge of the first fixed contact 16 when viewed in the axial direction. As a result, the first fixed contact 16 and the first movable contact 26 can be reliably brought into contact with each other.

The second movable contact 27 is connected to the movable contact piece 20. The second movable contact 27 is disposed to face the second fixed contact 17, and is contactable with the second fixed contact 17. Since the second movable contact 27 has a symmetrical shape with the first movable contact 26 with the axis Ax of the drive shaft 4 interposed therebetween, the description thereof will be omitted. In the present embodiment, the first movable contact 26 and the first fixed contact 16 are rectangular when viewed in the axial direction, but they may be circular, for example, or the first movable contact 26 and the first fixed contact 16 may have different shapes.

The contact piece holding portion 30 holds the movable contact piece 20 via the drive shaft 4. The contact piece holding portion 30 connects the movable contact piece 20 and the drive shaft 4. The contact piece holding portion 30 includes a holder 24 and a contact spring 25. The movable contact piece 20 is sandwiched between an upper portion of the holder 24 and a flange portion 4*a* of the drive shaft 4 in the axial direction. The contact spring 25 is disposed between the bottom of the holder 24 and the flange portion

4*a* of the drive shaft 4, and urges the drive shaft 4 and the movable contact piece 20 toward the separation direction Z2 side.

The drive shaft 4 extends along the contact direction Z1 and the separation direction Z2. The drive shaft 4 is connected to the movable contact piece 20 via the contact piece holding portion 30. The drive shaft 4 is movable together with the movable contact piece 20 in the contact direction Z1 and the separation direction Z2.

The electromagnetic drive device 5 moves the drive shaft 4 in the contact direction Z1 by an electromagnetic force. The electromagnetic drive device 5 is disposed below the contact case 11 in the housing 2.

The electromagnetic drive device 5 includes a coil 32, a spool 33, a movable iron core 34, a fixed iron core 35, an urging member 36, and a yoke 37.

The coil 32 is mounted on the outer circumference of the spool 33. The spool 33 includes a housing portion 33*a*. The housing portion 33*a* is provided on the inner peripheral portion of the spool 33. The housing portion 33*a* has a cylindrical shape and extends along the axial direction.

The movable iron core 34 is disposed in the housing portion 33*a*. The movable iron core 34 has a columnar shape, and the drive shaft 4 penetrates the center in the axial direction and is integrally movably connected to the drive shaft 4. The movable iron core 34 is movable together with the drive shaft 4 in the axial direction.

The fixed iron core 35 is disposed in the housing portion 33*a* to face the movable iron core 34 on the contact direction Z1 side of the movable iron core 34. The fixed iron core 35 is fixed to the yoke 37.

The urging member 36 is, for example, a coil spring, and is disposed between the movable iron core 34 and the fixed iron core 35. The urging member 36 urges the movable iron core 34 toward the separation direction Z2. Therefore, the urging member 36 is disposed between the movable iron core 34 and the fixed iron core 35 in a compressed state.

The yoke 37 includes a first yoke 37*a* and a second yoke 37*b*. The first yoke 37*a* has a plate shape and is disposed between the bottom portion 11*a* of the contact case 11 and the spool 33. The first yoke 37*a* overlaps the lower portion of the cylindrical portion 11*b* in the left-right direction. The second yoke 37*b* has a substantially U shape, and the bottom portion is disposed below the spool 33. The upper ends of both sides of the second yoke 37*b* are connected to the first yoke 37*a*.

Next, the operation of the electromagnetic relay 100 will be described. FIG. 1 shows a state in which no voltage is applied to the coil 32. When no voltage is applied to the coil 32, the urging member 36 prevents the movable iron core 34 from moving in the contact direction Z1. Therefore, the first movable contact 26 and the second movable contact 27 are in a state of being separated from the first fixed contact 16 and the second fixed contact 17.

Figure 4:
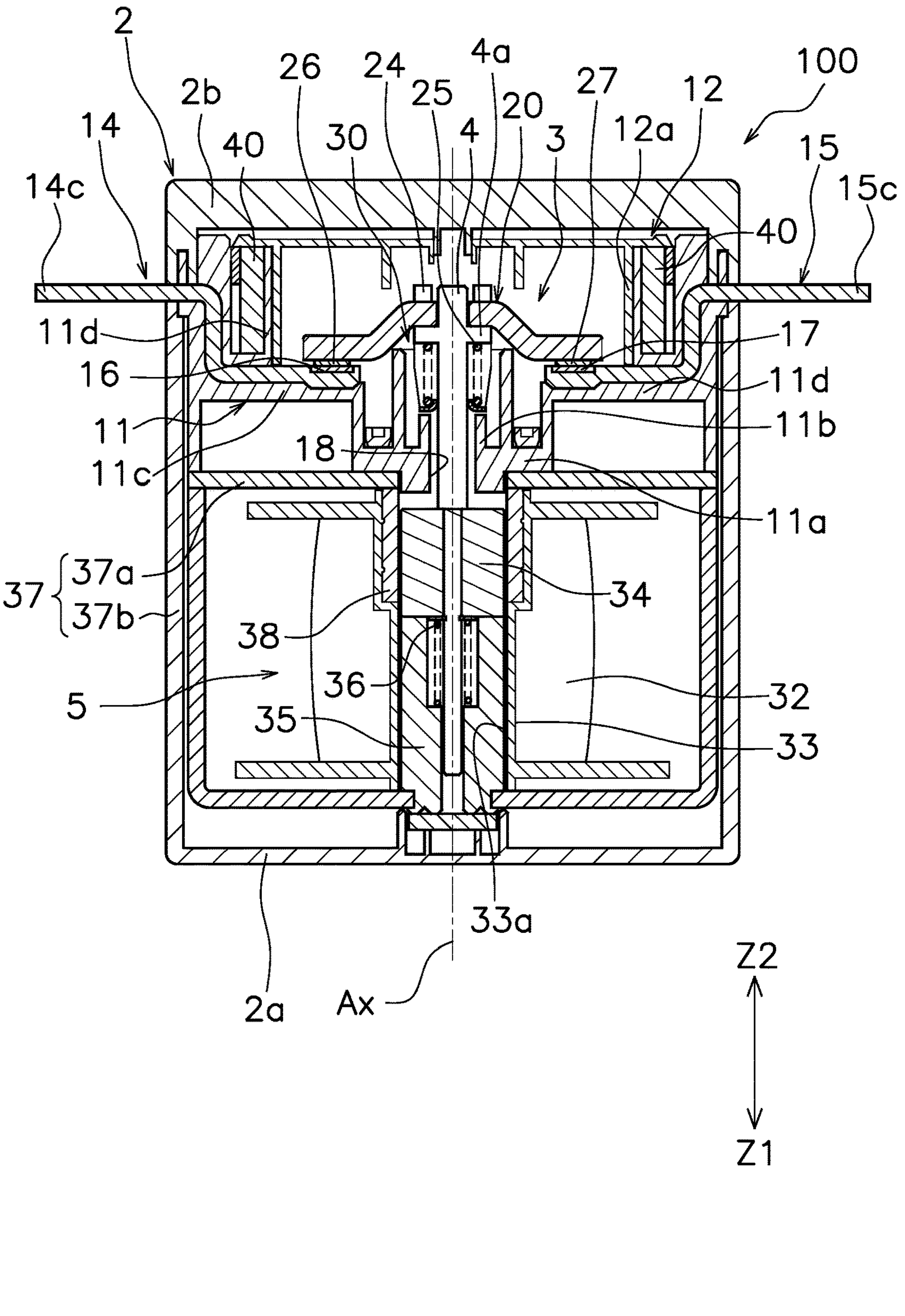
FIG. 4 is a cross-sectional view of an electromagnetic relay when a voltage is applied to a coil.

FIG. 4 shows a state in which a voltage is applied to the coil 32. When a voltage is applied to the coil 32 to excite it, the movable iron core 34 moves in the contact direction Z1 against the elastic force of the urging member 36 due to the electromagnetic force of the coil 32. As the movable iron core 34 moves, the drive shaft 4 and the movable contact piece 20 move in the contact direction Z1, and the first movable contact 26 and the second movable contact 27 contact the first fixed contact 16 and the second fixed contact 17.

When the application of the voltage to the coil 32 is stopped, the movable iron core 34 moves in the separation direction Z2 due to the elastic force of the urging member 36, and the first movable contact 26 and the second movable contact 27 are in a state of being separated from the first fixed contact 16 and the second fixed contact 17.

Here, as illustrated in FIGS. 1 and 4, a pair of permanent magnets 40 for arc extinguishing are provided in the contact case 11. The pair of permanent magnets 40 generate a magnetic flux in the left-right direction at a position between the first fixed contact 16 and the first movable contact 26. When a current flows in an up-down direction between the first fixed contact 16 and the first movable contact 26, the Lorentz force in the width direction of the movable contact piece 20 acts on the arc, and the arc is extended to the arc extension wall 12*a*. At this time, for example, if there is a step between the first fixed contact 16 and the first fixed terminal 14, the arc sticks to the step portion and the extension of the arc is hindered.

However, in the electromagnetic relay 100 according to the present embodiment, since the first fixed contact 16 is embedded in the first fixed terminal 14 to be flush with the first surface 14*a* of the first fixed terminal 14, it is possible to prevent the arc from sticking between the first fixed contact 16 and the first fixed terminal 14. As a result, the arc can be extinguished quickly. Even when an arc is generated between the second fixed contact 17 and the second movable contact 27, the same effect as described above can be obtained.

Further, since the contact surface A1 of the first movable contact 26 is smaller than the contact surface A2 of the first fixed contact 16, even if the position of the movable contact piece 20 shifts when the movable contact piece 20 moves, the first movable contact 26 and the first fixed contact 16 can be reliably brought into contact with each other. That is, it is possible to prevent the first fixed terminal 14 and the first movable contact 26 from coming into contact with each other. The same effect as described above can be obtained at the second movable contact 27 and the second fixed contact 17.

Although the embodiment of the electromagnetic relay according to one aspect of the present invention has been described above, the present invention is not limited to the above embodiment, and various modifications can be made without departing from the gist of the invention. For example, the configuration of the electromagnetic drive device 5 may be changed. The shape or arrangement of the coil 32, the spool 33, the movable iron core 34, the urging member 36, or the yoke 37 may be changed. The shape or arrangement of the housing 2, the contact device 3, the contact case 11, and the contact cover 12 may be changed.

Figure 5:
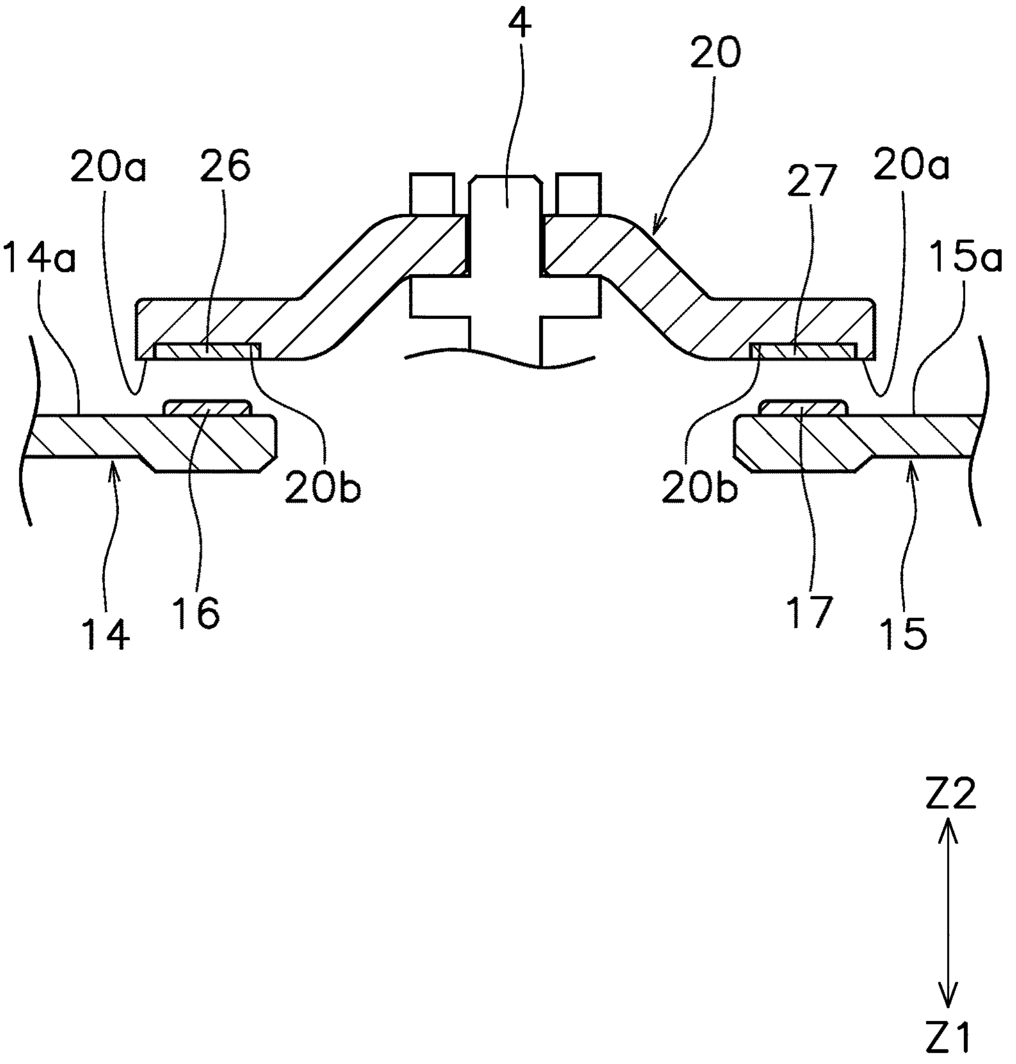
FIG. 5 is an enlarged cross-sectional view of a periphery of a movable contact piece according to a first modification.

FIG. 5 is an enlarged view of the periphery of the movable contact piece 20 according to the first modification. As illustrated in FIG. 5, the first modification is an example in which the shapes of the first fixed contact 16 and the first movable contact 26 in the above-described embodiment are interchanged with each other. Specifically, the first movable contact 26 is embedded in the movable contact piece 20 to be flush with the second surface 20*a* of the movable contact piece 20. The first movable contact 26 is disposed in a recess 20*b* formed by being recessed from the second surface 20*a* in the separation direction Z2.

The first fixed contact 16 protrudes from the first surface 14*a* of the first fixed terminal 14 toward the first movable contact 26. In this case, it is possible to prevent the arc from sticking between the movable contact piece 20 and the first movable contact 26. Further, as in the above-described embodiment, the first movable contact 26 and the first fixed contact 16 can be reliably brought into contact with each other. The second fixed contact 17 and the second movable contact 27 have a symmetrical shape with the first fixed contact 16 and the first movable contact 26 with the axis Ax of the drive shaft 4 interposed therebetween.

Figure 6:
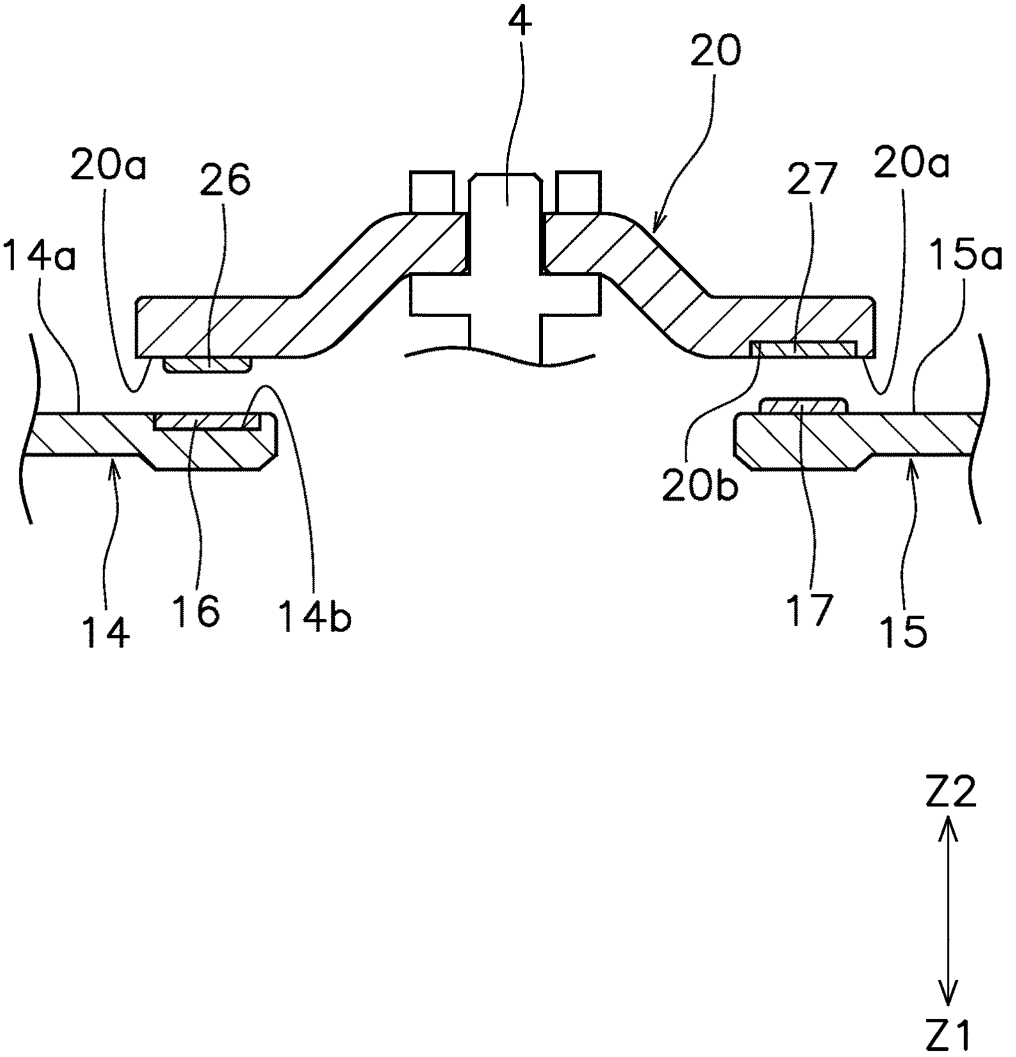
FIG. 6 is an enlarged cross-sectional view of a periphery of a movable contact piece according to a second modification.

FIG. 6 is an enlarged view of the periphery of the movable contact piece 20 according to the second modification. The second modification is an embodiment in which a step of a contact on cathode side where an arc is difficult to extend is eliminated when the electromagnetic relay 100 has polarity. The contacts on the anode side protrude toward the contacts on the cathode side. For example, in FIG. 6, the first fixed contact 16 and the second movable contact 27 are contacts on the cathode side, and the second fixed contact 17 and the first movable contact 26 are contacts on the anode side contacts.

The first fixed contact 16 is disposed in the recess 14*b* of the first fixed terminal 14 to be flush with the first surface 14*a* of the first fixed terminal 14. The first movable contact 26 protrudes from the second surface 20*a* of the movable contact piece 20 toward the first fixed contact 16. The first movable contact 26 includes a contact surface A1 smaller than the first fixed contact 16 when viewed from the direction facing the first fixed contact 16. In the second modification, the second surface 20*a* of the movable contact piece 20 is an example of the third surface.

The second fixed contact 17 protrudes from the first surface 15*a* of the second fixed terminal 15 toward the second movable contact 27. The second fixed contact 17 includes a contact surface A2 smaller than the second movable contact 27 when viewed from a direction facing the second movable contact 27. In the second modification, the first surface 15*a* of the second fixed terminal 15 is an example of the second surface. The second movable contact 27 is disposed in the recess 20*b* of the movable contact piece 20 to be flush with the second surface 20*a* of the movable contact piece 20.

Figure 7:
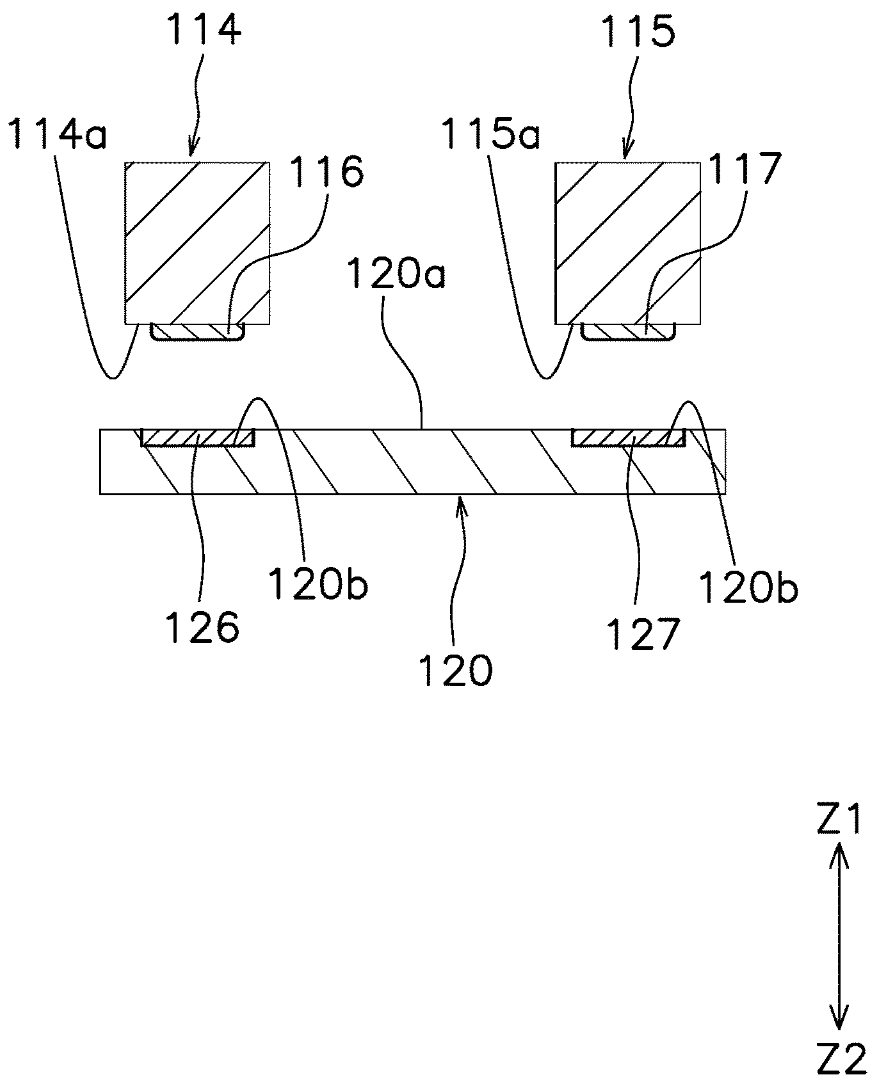
FIG. 7 is an enlarged schematic view around a movable contact piece according to a third modification.

FIG. 7 is an enlarged schematic view around the movable contact piece 120 according to the third modification. In the third modification, the contact direction Z1 and the separation direction Z2 are opposite to those of the above-described embodiment. The first fixed terminal 114 and the second fixed terminal 115 are composed of substantially cylindrical terminals extending in the axial direction.

As illustrated in FIG. 7, the first fixed contact 116 protrudes from the first surface 114*a* of the first fixed terminal 114 toward the first movable contact 126. The second fixed contact 117 protrudes from the first surface 115*a* of the second fixed terminal 115 toward the second movable contact 127. Each of the first movable contact 126 and the second movable contact 127 is disposed in the recess 120*b* of the movable contact piece 120 to be flush with the second surface 120*a* of the movable contact piece 120.

Figure 8:
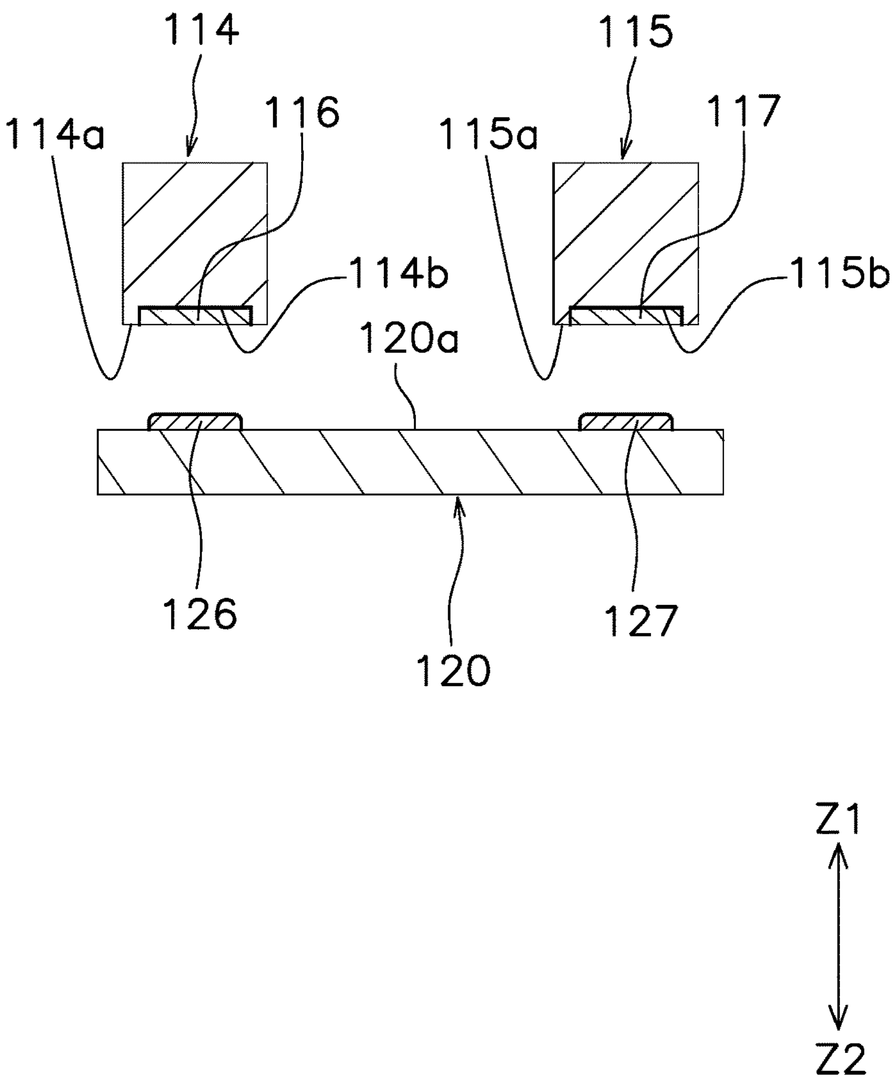
FIG. 8 is an enlarged schematic view around a movable contact piece according to a fourth modification.

FIG. 8 is an enlarged schematic view around the movable contact piece 120 according to the fourth modification. As illustrated in FIG. 8, the fourth modification is an embodiment in which the shapes of the first fixed contact 116 and the first movable contact 126 and the shapes of the second fixed contact 117 and the second movable contact 127 in the third modification are interchanged with each other. The first fixed contact 116 is disposed in the recess 114*b* of the first fixed terminal 114 to be flush with the first surface 114*a* of the first fixed terminal 114. The second fixed contact 117 is disposed in the recess 115*b* of the second fixed terminal 115 to be flush with the first surface 115*a* of the second fixed terminal 115. The first movable contact 126 protrudes from the second surface 120*a* of the movable contact piece 120 toward the first fixed contact 116. The second movable contact 127 protrudes from the second surface 120*a* of the movable contact piece 120 toward the second fixed contact 117.

REFERENCE NUMERALS

4 drive shaft
5 Electromagnetic drive
14 First fixed terminal
14*a* First surface
14*b* Recess
15 Second fixed terminal
15*a* First side
15*b* Recess
16 First fixed contact
17 Second fixed contact
20 Movable contact piece
20*a* Second surface
20*b* Recess
26 First movable contact
27 Second movable contact
100 Electromagnetic relay
A1 Contact surface
A2 Contact surface
Z1 Contact direction
Z2 Separation direction

The invention claimed is:

1. An electromagnetic relay comprising:

a first fixed terminal including a first surface;

a second fixed terminal including a second surface, the second fixed terminal being disposed apart from the first fixed terminal;

a movable contact piece including a third surface disposed to face the first surface and the second surface;

a first fixed contact embedded in the first fixed terminal to be flush with the first surface;

a second fixed contact protruding from the second surface of the second fixed terminal toward the third surface;

a first movable contact disposed to face the first fixed contact, the first movable contact being contactable with the first fixed contact, the first movable contact protruding from the third surface toward the first surface;

a second movable contact disposed to face the second fixed contact, the second movable contact being contactable with the second fixed contact, the second movable contact being embedded in the movable contact piece to be flush with the third surface;

a drive shaft integrally movably connected to the movable contact piece; and an electromagnetic drive device configured to move the drive shaft in a contact direction in which the first fixed contact and the first movable contact come into contact with each other and the second fixed contact and the second movable contact come into contact with each other, and in a separation direction in which the first fixed contact and the first movable contact are separated from each other and the second fixed contact and the second movable contact are separated from each other, wherein the first fixed contact and the second movable contact are cathode contacts.

2. The electromagnetic relay according to claim 1, wherein the first movable contact includes a first contact surface smaller than the first fixed contact when viewed from a first direction facing the first fixed contact, and the second fixed contact includes a second contact surface smaller than the second movable contact when viewed from a second direction facing the second movable contact.

3. The electromagnetic relay according to claim 1, wherein the first surface of the first fixed terminal has a flat shape along a direction orthogonal to the drive shaft.

4. The electromagnetic relay according to claim 3, wherein the first fixed terminal includes a recess that is recessed from the first surface in the contact direction, and the first fixed contact is disposed in the recess of the first fixed terminal.

5. The electromagnetic relay according to claim 1, wherein the third surface of the movable contact piece has a flat shape along a direction orthogonal to the drive shaft.

6. The electromagnetic relay according to claim 5, wherein the movable contact piece includes a recess that is recessed from the third surface in the separation direction, and the second movable contact is disposed in the recess of the movable contact piece.

* * * * *